United States Patent [19]

Beckwith

[11] Patent Number: 5,530,338
[45] Date of Patent: Jun. 25, 1996

[54] LOAD TAPCHANGER TRANSFORMER PARALLELING BY DAISY CHAIN COMPARISON OF LOAD CURRENTS

[76] Inventor: Robert W. Beckwith, 2794 Camden Rd., Clearwater, Fla. 34619

[21] Appl. No.: 398,869

[22] Filed: Mar. 6, 1995

[51] Int. Cl.[6] .................................................. G05F 1/14
[52] U.S. Cl. ............................................................. 323/255
[58] Field of Search .................................. 323/247, 255, 323/256, 257, 258; 336/137, 138, 142, 143, 145, 150

[56] References Cited

U.S. PATENT DOCUMENTS

| | | | |
|---|---|---|---|
| 3,747,038 | 7/1973 | McGill | 336/150 |
| 3,944,913 | 3/1976 | Kugler | 323/258 |
| 4,130,789 | 12/1978 | Neumann | 323/340 |
| 5,155,672 | 10/1992 | Brown | 323/255 |
| 5,210,443 | 5/1993 | Kugler | 307/17 |

*Primary Examiner*—Matthew V. Nguyen
*Attorney, Agent, or Firm*—Leo J. Aubel

[57] ABSTRACT

A system and method of paralleling tapchanging transformers. The transformers are connected to provide a daisy chain of output load currents processed as pairs of currents by each tapchanger control. Transformer load currents are balanced as desired regardless of whether or not transformer primaries are supplied in parallel.

9 Claims, 10 Drawing Sheets

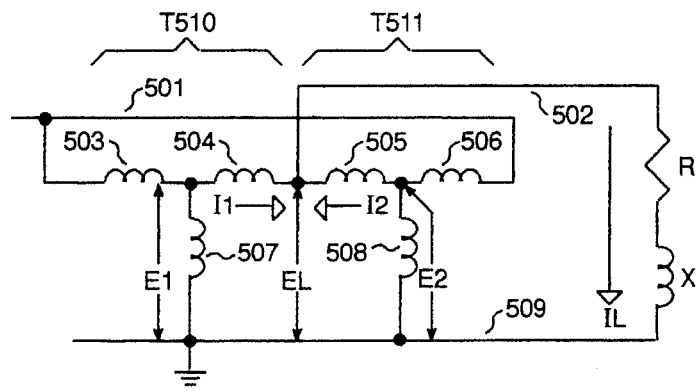
Fig. 7a)
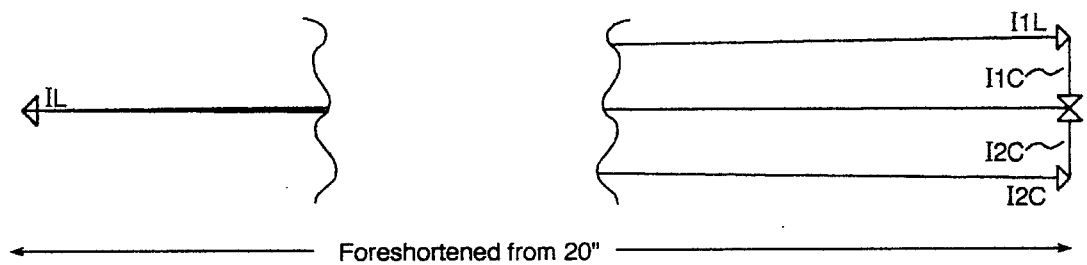
Foreshortened from 20"
Fig. 7b)
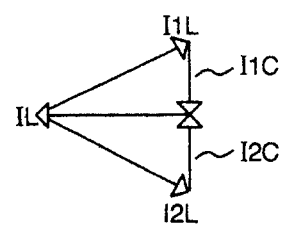 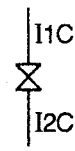
Fig. 7c)  Fig. 7d)

LOAD TAPCHANGER TRANSFORMER PARALLELING BY DAISY CHAIN COMPARISON OF LOAD CURRENTS

BACKGROUND OF INVENTION

It is sometimes desirable at an electric utility substation to use more than one load tapchanging (LTC) transformers such as 9, 10, or 11 of FIG. 1a or fixed transformer/regulator combinations such as 39/42, 40/43, or 41/44 shown in FIG. 1b, with the primary inputs and secondary outputs selectively connected in parallel. The term, 'tapchanging unit' or 'unit' is used hereinunder to be either:

a) a single LTC transformer containing the tapchanging switch and related auxiliary components, or b) the combination of a fixed ratio transformer directly fed into a tapchanging regulator wherein the combination performs essentially the same task as an LTC transformer.

In either case it is accepted industry practice to provide a central tap switch position with 16 steps of voltage raise and 16 steps of voltage lower on either side of the center. A further industry practice is for each step to give 5/8% output voltage change, thereby providing a maximum range of +/−10% in voltage adjustment.

FIG. 2 shows the tapswitching details of one phase of a three phase tapchanging transformer. At neutral, a buck/boost switch operates and together with a center tapped bridging autotransformer gives a +/−10% voltage regulation range. The output voltage, E, comes from the center tap of the autotransformer with the contacts stepping, for example, from neutral (N) position to a position with one switch contact on (N) and the other on (1), and with the autotransformer dividing the tap to tap voltage of 5/4% down to 5/8% of the output voltage. At the next step, both contacts could be on position (1).

Winding C of transformer T1 is generally a higher voltage than winding B in the normal use of stepping voltages down from transmission level to subtransmission or from sub transmission further down to distribution levels. Alternatively a fixed ratio transformer is used to step the voltage down followed by a regulator for voltage regulation.

FIG. 2 also represents a single phase regulator wherein the voltage is brought in at point A and winding C is not used.

One method of paralleling uses various combinations of auxiliary switches on each transformer in order to sense whether the two tapchanging switches are on the same position and to determine which transformer should move its tapchanger switch next in order to bring the tapchanger switches back to the same tap when a deviation is detected. This method of paralleling often used an auxiliary switch on each tapchanger mechanism that was, say closed on even taps and open on odd taps. This method has fallen into disfavor due to the complexity of the switching circuitry and the auxiliary switch maintenance requirements.

FIG. 3 illustrates the circulating current method of paralleling in most common use today. This illustration is taken from an instruction book by the Beckwith Electric Co. Inc., Largo, Fla. 34643 and illustrates use of the Beckwith Electric Model M-0115 parallel balancing units, Model M-0067 tapchanger controls, Model M-0127 overcurrent relays and Model M-0169 auxiliary current transformers. The network essentially forms a 60 Hz current analog of the quadrature current flowing between the two LTC transformers. Whenever the transformers are not on the same tap positions, the network feeds a measure of the circulating current into the M-0067 controls as a voltage in quadrature with the circulating current in such a way to change and reduce the circulating current towards zero.

This method has the disadvantage of requiring experimental setting of the gain of the system by devices, K3, as seen in the Model M-0115 units of FIG. 3, so as to establish an operating point where the paralleled controls do not hunt and yet operate with tap switches within one or two taps of each other.

A third method is introduced by U.S. Pat. No. 5,210,443 issued to Kurt Kugler on May 11, 1993. The Kugler method uses a parallel digital processor with radial two way data exchange between each tapchanging unit and a central processor. This is essentially a use of the principle of circulating current except that measurements are made in each control sufficient to determine the circulating current but with computations of the circulating currents necessary for paralleling being done in a central computer rather than in each individual control as in the circulating current method, described with reference to FIG. 3.

The prior art also discloses computer programs for solving alternating current (AC) networks wherein elements are phasors. For example, networks as depicted in FIGS. 9 and 10 can be investigated with elements represented either by a series resistive (R) part and a reactive (X) part or by parallel conductance (G) part and a susceptance (B) part. FIGS. 9 and 10 will be discussed in more detail hereinbelow.

SUMMARY OF THE INVENTION

The inventive method takes advantage of phase angle relations between transformer load currents as indications of the circulating currents between paralleled LTC transformers without actually measuring the circulating currents. In the present invention, only the relative signs of these phase angles are used as an indication of the circulating current to form logic rules which permit tapchanger switches to follow each other when connected in a ring configuration.

The foregoing features and advantages of the present invention will be apparent from the following more particular description. The accompanying drawings, listed hereinbelow, are useful in explaining the invention.

DESCRIPTION OF THE DRAWINGS

FIG. 7a is a diagram showing internal models for two paralleled transformers.

FIGS. 7b through 7g depicts phasor diagrams useful in explaining circulating reactive current flowing between two tapchanging transformers operating in parallel.

FIG. 9 is an impedance diagram corresponding to the circuit of FIG. 1a.

DESCRIPTION OF THE INVENTION

Figure 4:
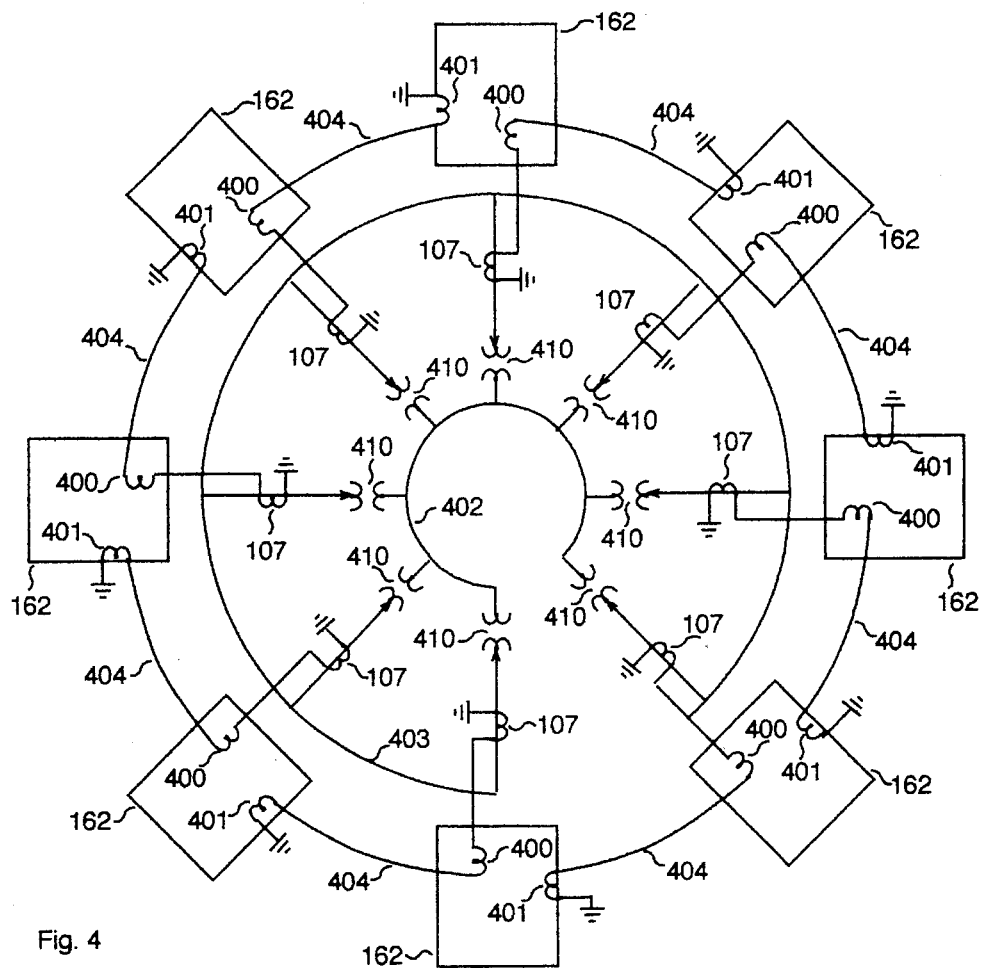
FIG. 4 is a circuit diagram for eight paralleled units, simplified to emphasize the single conductor daisy chain connection of current circuits as required by the inventive method of paralleling.

In contrast to the prior art circulating current method of paralleling, FIG. 4 shows the present invention using a ring of 8 tapchanger controls 162 with a daisy chain connection 404 of analogs of load currents, wherein each control inputs its own analog of load current and the load current of the next tapchanging unit around the ring. While FIG. 4 shows a ring of 8 tapchanging units with all circuit breakers omitted, it represents any number of paralleled tapchanging units 410 which may be paralleled using the daisy chain connections 404 for the load current circuits. Note that the ring has neither a beginning nor an end.

As indicated by two windings and an arrow, tapchanging units are shown as load tapchanging power transformers, 410, and are connected in parallel between input bus 402 and output bus 403. Analogs of units 410 load currents are carried from current transformers 107 to primary windings of auxiliary current transformers 400 contained in controls 162 thence from windings 400 via conductors 404 to primary windings of auxiliary current transformers 401 contained in each adjacent control 162 in a clockwise direction around the loop and thence from the windings 401 to grounds returning the current paths to the ground connections on current transformers 107. High voltage bus 402 is shown as a closed ring as is sometimes the industry practice. Bus 402 could be divided into sections, however, with each section fed from divergent points in the power supply network. The low voltage output bus 403 is shown with a single break in the ring with all unit outputs operating in parallel.

With parallel sources of power, as for example provided by bus 402, no other conductors or communications circuits are required between tapchanger controls 162 by the inventive method for parallel operation. No other form of data exchange is required and the need for circulating current balance equipment is eliminated. The present inventive method uses only the sign of the phase angle between the analogs of load currents connected to each control with logic determined in each transformer control wherein the controls follow each other in tapchanging so as to minimize the differences in tap positions between units around the ring.

Figure 5:
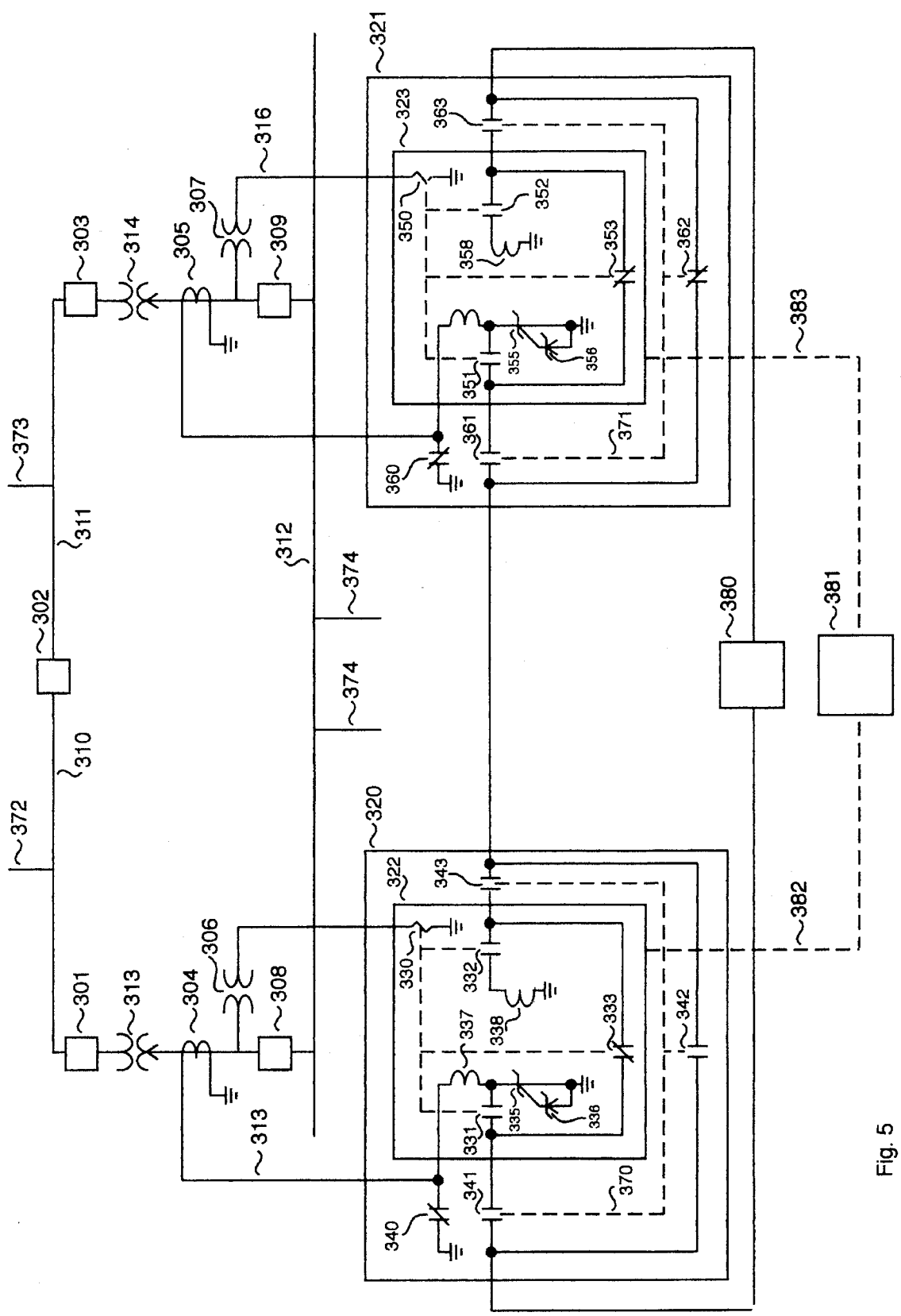
FIG. 5 is a circuit diagram illustrating in greater detail the inventive connection of load currents for paralleling two tapchanging units.

Referring now to FIG. 5, a ring of transforming units is used to describe methods of automatically taking one unit out of service and leaving the others in operation. For clarity, only two units, 313 and 314 and their controls 320 and 321 are shown in detail, however box 380 indicates where additional tapchanging units could be inserted.

Figure 12:
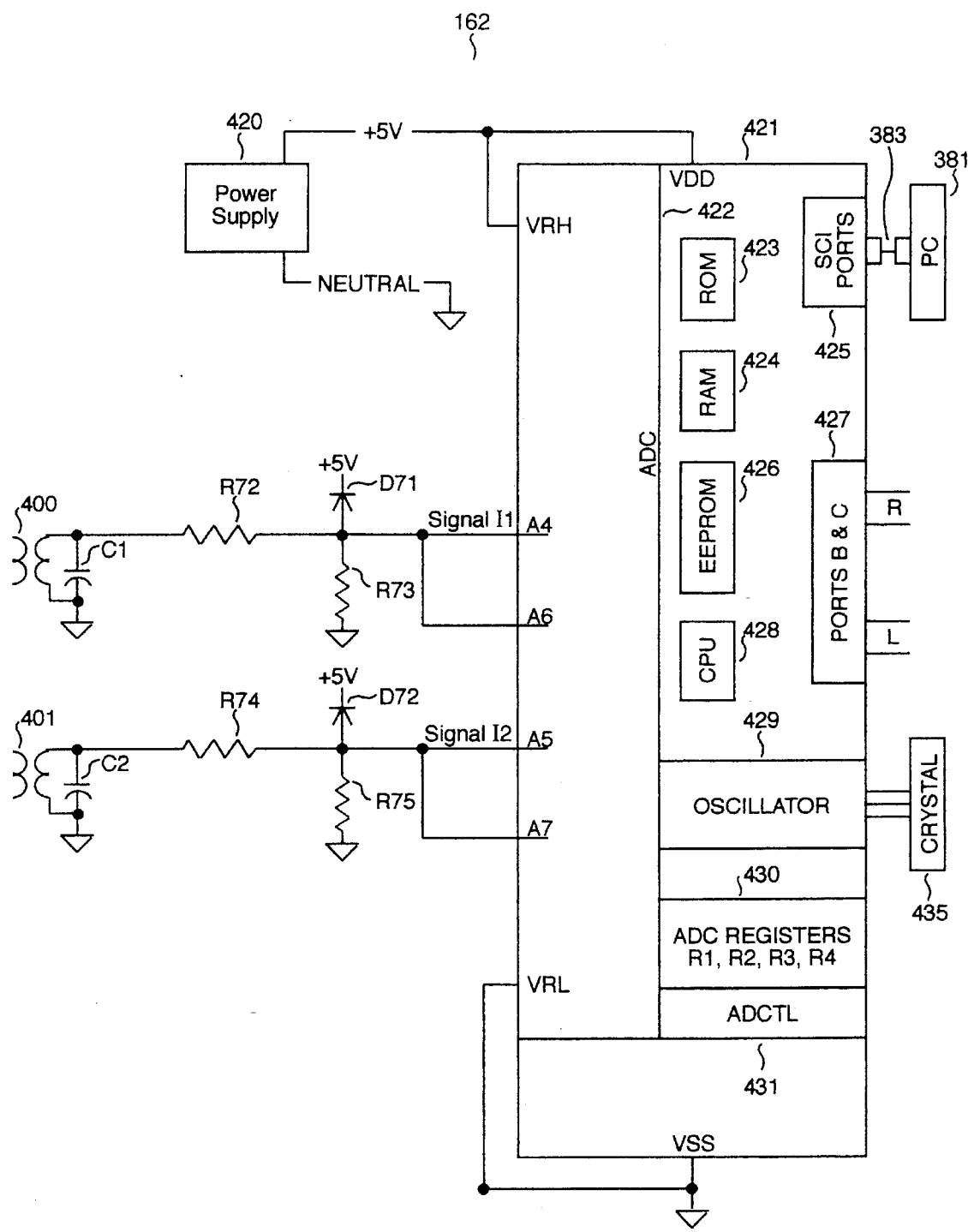
FIG. 12 is a circuit diagram showing a circuit for measurement of the phase angle between two currents.

A first load current is obtained from current transformer 304 and flows through the primary 337 of an auxiliary current transformer, not otherwise shown here but shown in FIG. 12, located in tapchanger control 322, and from there through a contact 331 of AC voltage relay 330, through switch 370 contact 341 of unit control 320, through switch 371 contact 363 of unit control 321, through contact 352 of AC voltage relay 350, through primary 358 of an auxiliary current transformer, not otherwise shown here but shown in FIG. 12, located in tapchanger control 323, and then to a common ground with current supply transformer 304, thereby completing a loop for the first current. A second load current is obtained from current transformer 305 of and flows through the primary 357 of an auxiliary current transformer, not otherwise shown, located in tapchanger control 323, and from there through a contact 351 of AC voltage relay 350, through switch 371 contact 361 of unit control 321, through switch 370 contact 343 of unit control 320, through contact 332 of AC voltage relay 330, through primary 338 of an auxiliary current transformer, not otherwise shown, located in tapchanger control 322, and then to a common ground with current supply transformer 305, thereby completing a loop for the second current.

Circuit breakers 301 and 308 are operable to remove tapchanging unit 313 from service, thereby removing voltage from relay 330. Circuit breakers 303 and 309 are operable to remove tapchanging unit 314 from service, thereby removing voltage from relay 350.

Single phase transformer 306 furnishes AC voltage for tapchanger control 322 and AC voltage relay 330. Single phase transformer 307 furnishes AC voltage for tapchanger control 323 and AC voltage relay 350.

Upon loss of AC voltage, relay 330 drops out thereby opening paths for the first and second currents by means of contacts 331 and 332 and connecting the paths for the first and second currents together by closing contact 333 thereby automatically taking tapchanger control 322 out of service. Upon loss of AC voltage, relay 350 drops out thereby opening the first and second currents by means of contacts 351 and 352 and connecting the paths for the first and second currents together by closing contact 353 thereby automatically taking tapchanger control 323 out of service.

Contacts 340, 341, 342 and 343 of switch 370 are manually operable from unit control 320 to open the first and second currents, bypassing their paths and providing a ground return for the first current thereby manually removing tapchanger control 322 from service. Contacts 360, 361, 362 and 363 of switch 371 are manually operable from unit control 321 to open the first and second currents, bypassing their paths and providing a ground return for the second current thereby manually removing tapchanger control 323 from service.

Upon opening of contacts 331, 341, 363, or 352, the combination of triac 335 and zener diode 336 are operable to provide a return path to ground for the first current. Upon opening of contact 351, 361, 343, or 332, the combination of triac 355 and zener diode 356 are operable to provide a return path to ground for the second current.

Three phase high voltage bus 310 receives power from transmission line 372. Three phase high voltage bus 311 receives power from transmission line 373. Circuit breaker 302 is closable to provide local parallel power feed to tapchanging units 313 and 314 and openable to provide power feed from divergent points in a power network (not shown).

Low voltage bus 312 feeds one or more sub-transmission or distribution circuits 374, in parallel; receiving power via circuit breakers 308 and 309 when the breakers are closed.

Figure 7E:
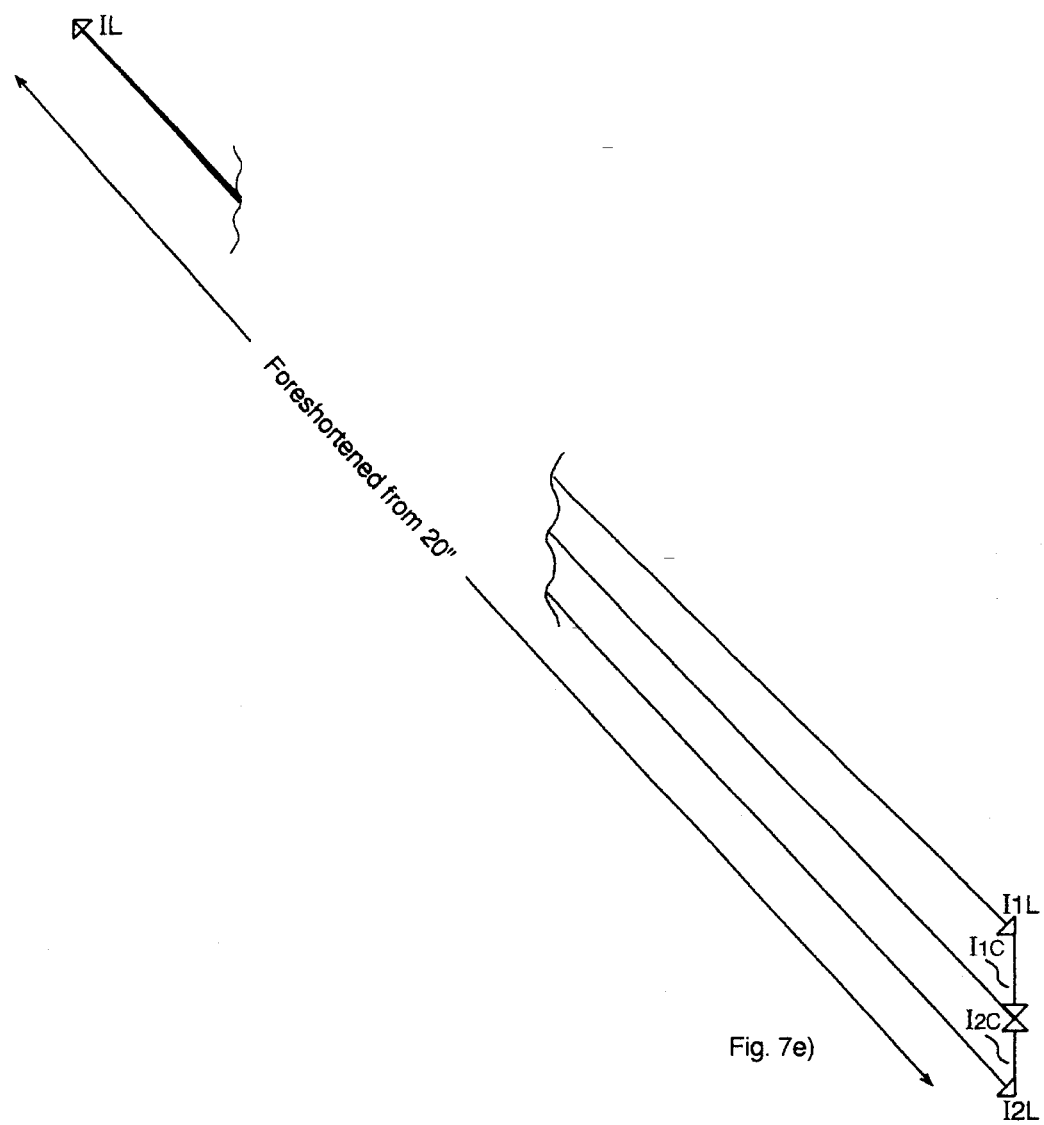

FIG. 7a illustrates an internal diagram of a transformer and FIGS. 7b through 7g are phasor diagrams which are used hereinunder to explain the circulating current that flow between transformers when connected in parallel.

The impedance of a tapchanging transformer is typically 0.05 per unit or 5% In FIG. 7a this is the ratio of series impedance 504 to the sum of impedances 504 and 507 in transformer T510 and the ratio of impedance 505 to the sum of impedances 505 and 508 for transformer T511. The impedance actually consists of an inductance and resistance in series with an X/R ratio, at 60 Hertz, as high as 100. Because of this high ratio, it is common practice to assume that the resistive component is zero and henceforth here only the inductive portions are shown in FIG. 7a.

Other parts of FIG. 7a consist of the high voltage (HV) power feed 501 to transformers T510 and T511, a power output bus 502, input impedances 503 and 506, and ground or neutral circuit 509. The load impedance for the parallel connection of the two transformers consists of a series combination of resistance R and reactance X.

Figure 2:
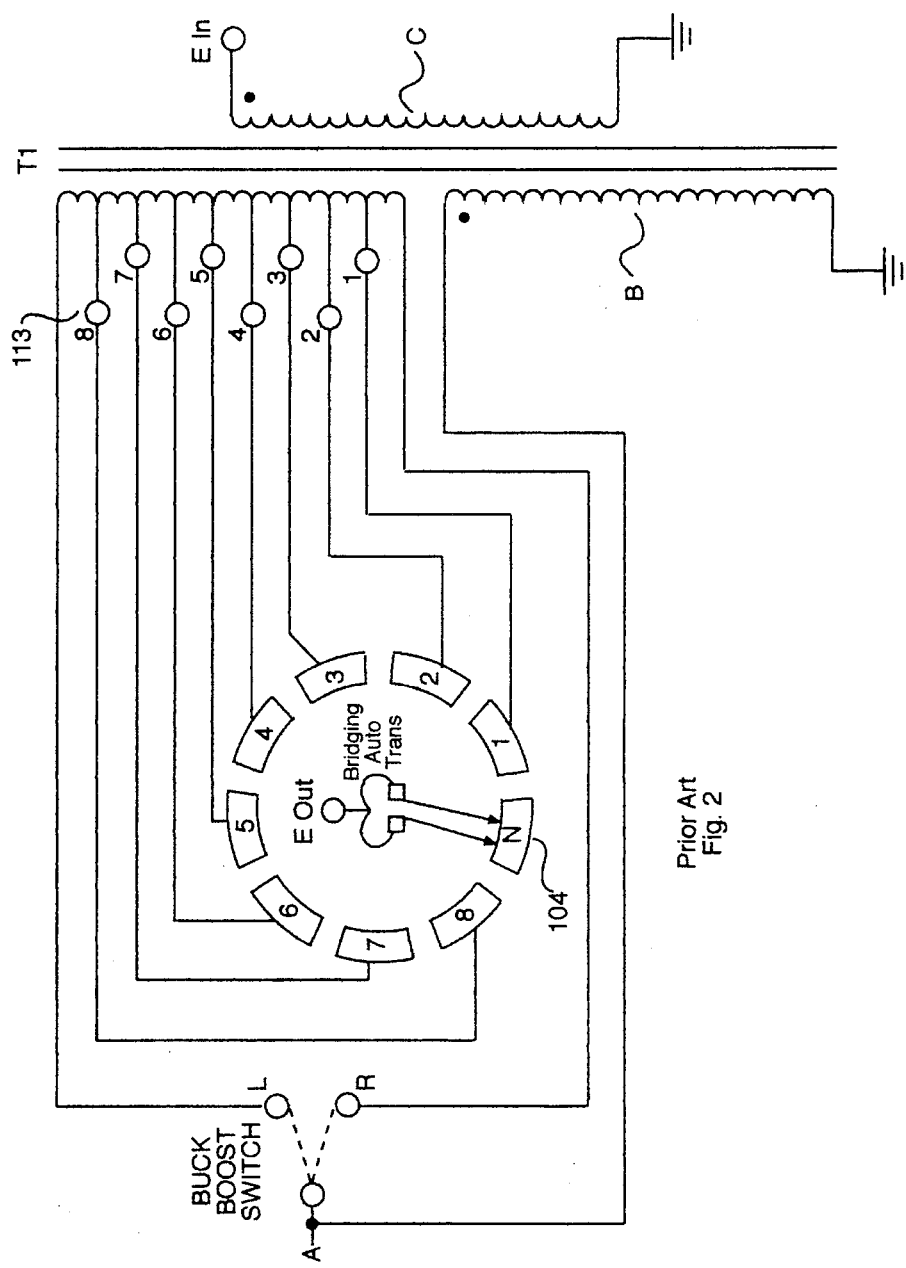
FIG. 2 shows the details for a load tap changing switch.
Figure 3:
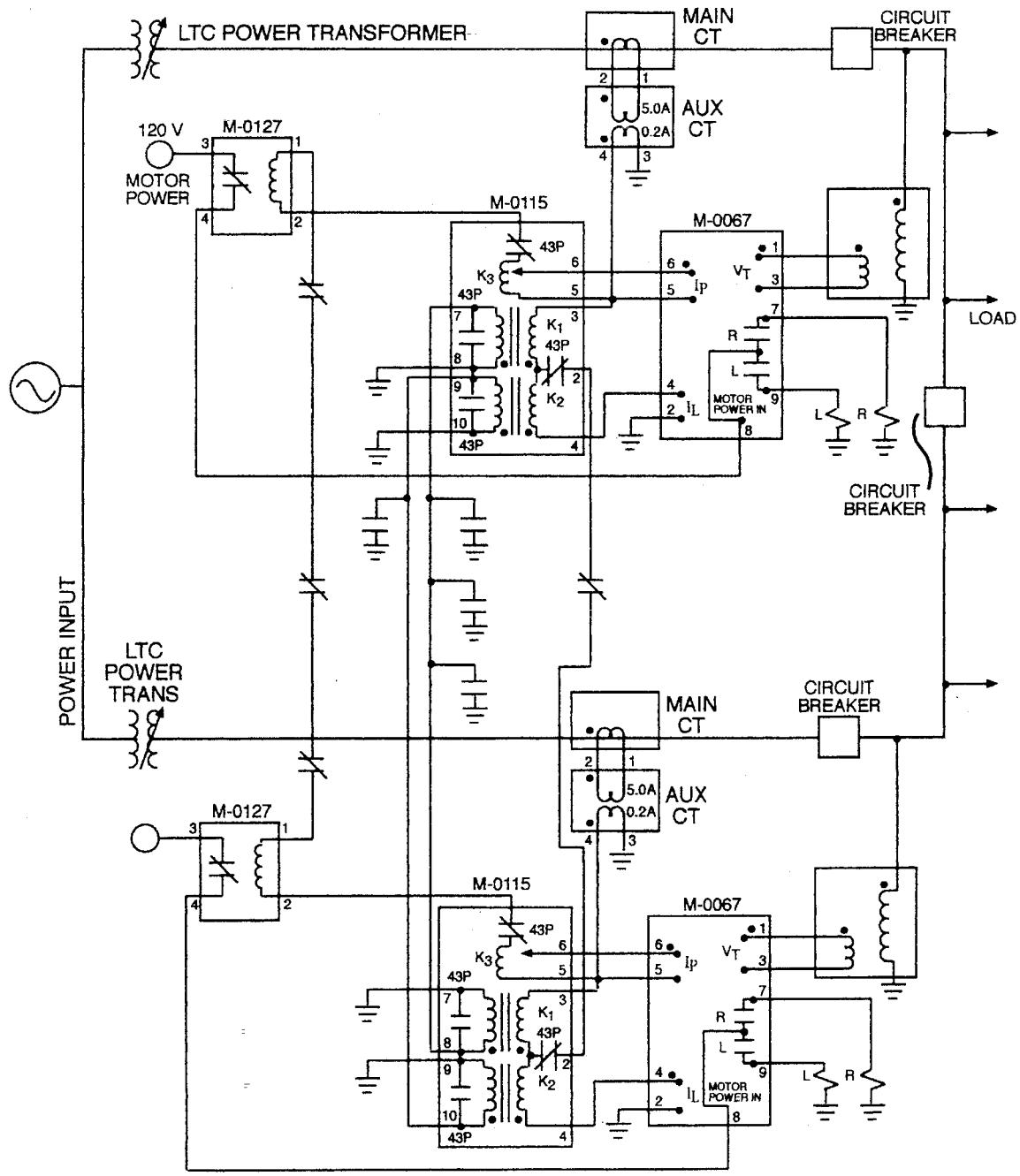
FIG. 3 is a schematic of a prior art paralleling scheme for two tapchanging units using the circulating current method of paralleling.

A single step difference in switch 104 (see FIGS. 2 and 6) positions will cause a ⅝% difference in the internal transformer voltages E1 and E2 each driving current through the transformer impedances 504 and 505 respectively to a common paralleling connection point 502. Thus with typical values of 5% for transformer impedances 504 and 505, the ⅝% difference in voltages E1 and E2 will cause a current to circulate between the transformers T510 and T511 of I=E/Z or in the example given:

$$I = 0.0625\% / (2 \times 0.05) = 0.625\% \text{ current}$$

where 100% is full load current.

Since the transformer impedance is inductive, the circulating current will be 90 degrees displaced from unity power factor load current. Assuming transformer T510 is on the higher tap and as a result voltage E1 exceeds voltage E2. With no external R and X load, transformer T510 load current I1 (the circulating current) will therefore lead the parallel output voltage EL by 90° and transformer load current I2 (the reverse of the circulating current) will lag the parallel output voltage EL by 90°. Note that it is common industry practice to call a provider of leading current a source of VARs and a provider of lagging current a sink for VARs. Therefore a paralleled transformer with a higher internal voltage is termed the source of circulating current and paralleled transformers with a lower internal voltage termed sinks for circulating current.

The reactive current which circulates between two transformer units T510 and T511 when connected in parallel creates a load current phase difference between the two transformers. The difference may be due to a difference in tap position between the paralleled units or may be due to slight differences in the manufacture of the transformers. FIG. 7b is a phasor diagram for a full resistive load on the parallel combination where transformer load currents I1 and I2 are shown together with the load current I1 flowing through R. With 5% transformer reactances, the phase angle between the two transformers individual output currents I1 and I2 will be the angle whose tangent is approximately 0.1 giving an angle of approximately 6 degrees.

Phasor I1c of FIG. 7b is the component of leading reactive current flowing out of transformer T510 and phasor I2c is the component of lagging current flowing out of transformer T511. Phasor I2C cancels phasor I1c so that no reactive current flows through load resistor R. Equivalently phasor I2c could have been shown with polarity reversed as leading current flowing into transformer T511 as a sink.

FIG. 7c is the same as FIG. 7b but with about ½0th of the magnitude of load current. As can be seen, the angle between currents I1 and I2 is now approximately 60°.

FIG. 7d shows currents I1 and I2 with zero load current. Here the currents I1 and I2 are 180° apart and the sign of the angle changes polarity, as it does again at zero degrees. The control 162 recognizes any phase angle between currents I1 and I2 as either positive or negative with no indeterminant conditions allowed.

FIG. 7e is similar to FIG. 7a and shows a load current that is 45° lagging (a power factor of 70.7). Here the angle to be sensed is reduced to a value of 0.70×6° or 4.2°.

Figure 7F:
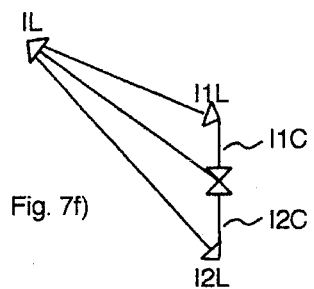
Figure 7G:

FIG. 7f is similar to FIG. 7e but with approximately ½0th of the magnitude of load current. Here again the angle has increased, perhaps to 30°.

This analysis shows that, under some conditions, the present inventive method of paralleling requires rather accurate measurement of AC voltages and relative phase angles of two currents. A system and programming means and methods for use with the present invention for obtaining accurate measurements by the zero crossing method of phase angle measurement are disclosed in U.S. Pat. No. 5,315,527 issued to Robert W. Beckwith, the inventor herein and in U.S. patent application Ser. No. 08/246,630, filed by Robert W. Beckwith on May 20, 1994. U.S. Pat. No. 5,315,527 and U.S. application Ser. No. 08/246,630 are incorporated herein by reference.

The accuracy of the voltage measurement assures proper coordination of the band edge voltages on the various controls. The effective bandwidth is from the highest voltage limit of one control to the lowest voltage limit of the other control. With the accuracy of +/−0.1% in determining voltage magnitude obtainable from use of the above referenced patent and patent application, this widening will be so small as to be negligible.

An further inventive improvement in accuracy and simplification in measurement of the phase angle between two current signals is described hereinunder, capable of determining the relative phase angle between two current waves to within +/−0.22° which is adequate for the present inventive method of paralleling as indicated above using FIG. 7a through 7g. Suitable accuracy may be possible using other known methods of determining relative phase angles of two currents.

The inventive method blocks the raise commands to move the tap position to raise the voltage, but permits lower commands to move the tap position to lower the voltage when the first load current leads the second load current, as represented by an upward arrow, ↑, in Table 1. Conversely, the inventive method blocks lower but permit raise where the first load current lags the second load current, as represented by a downward arrow, ↓, in Table 1. In both instances, this permits only the control which should make a tap change to do so, thereby keeping the tapchangers together. The performance is better understood by following several typical sequences of operation illustrated by Table 1 and the accompanying explanation.

It is conventional practice for tapchanger controls to have a bandwidth of from 2 to 6 Vac. The tapchanger does not operate so long as the measured voltage is within the band and therefore this invention does not correct tap differences until the measured voltage goes above or below the band edges for durations of time T or T+T' as described hereinunder.

1) For a first elementary example, assume that two units are connected in parallel as illustrated by FIG. 5 and initially are on the same taps with the voltage within the band. Now assume that the voltage goes only a slight amount below the band, say 0.1% and stays there for some time. Assume slight differences in voltage measurement, causing the first control 313 to time out and raise its switch one tap. This will cause a ⅝% increase in transformer 313 internal voltage but this causes only ⁵⁄₁₆% increase in the voltage at the point of paralleling with the transformers' impedances 313 and 314 acting as a voltage divider. Assume that the voltage returns to within the band and therefore no correcting change is made. It is well known that the added loss due to a one step difference is small and is accepted so long as a forthcoming change in voltage leads to correction.

2) Assume next, that the voltage again goes a slight amount below the band. The first control, on the transformer whose tap is high, measures a leading angle and is properly blocked from raising and therefore caused to wait for the second control 323, whose tap is low. The second control 323 measures a lagging angle and is permitted to raise its tap after time T, thus eliminating the tap position difference.

3) Assume now that instead of the action described under paragraph 2), above, that the voltage slowly goes to the upper band limit. During this time, the one tap difference will persist, however will be corrected in the first excursion above the band as follows: The first control 322 on the transformer 313 whose tap is high again measures a leading angle and is properly blocked from raising but lowers its tap as its timer times out. The second control, measuring a lagging angle is blocked from lowering and forced to wait for the first control to sense the above band condition and to time out.

It is seen by these examples that at band edges, the logic driven by the relative phase angle causes controls and the associated transformer to alternate in their response to out of band conditions. This alternation can result in a one step difference to persist while the voltage goes from one band edge to the other, however this acceptable one step difference is generally the limit which the inventive scheme will allow.

LEGEND FOR TABLE 1

Tr1, Tr2, ... Trn: Paralleled units 410, number 1 through number n. See FIG. 4 where n=8 and the choice of numbering around the ring is arbitrary.

↑ under Trx means tap logic allows a move to a higher tap.

↓ under Trx means tap logic allows a move to a lower tap.

TAP: Tap position

The inventive method is very nonlinear as compared to the circulating current method and therefore its performance can best be explained by listing a series of tapchanging operations of a ring of paralleled units, as shown in FIG. 4, and by making assumptions as to the conditions of each paralleled unit and the errors of measurement after each step as illustrated in Table 1. The following is a list of those assumptions and their explanation. The list is numbered to correspond with the steps of Table 1. The numbered lines show the tap positions of each paralleled unit which result from the previous line conditions together with the directional arrows indicating the next allowable switch change for each unit after time T.

The rules which the inventive control follows are:

1) With ↑ showing, a raise output is given after an integrated low voltage out of band condition is seen for time T.

2) With ↑ showing, a lower output is given after an integrated low voltage out of band condition is seen for time T+T'.

3) With ↓ showing, a lower output is given after an integrated high voltage out of band condition is seen for time T.

4) With ↓ showing, a raise output is given after an integrated high voltage out of band condition is seen for time T+T'.

5) A change in the sign of the angle resets the timers.

6) Any tap change resets the timers.

7) A voltage return to within the band reset the timers.

A first illustrative tapchange sequence uses lines 1) through 6) of Table 1.

1) This starting condition is arbitrarily set to show a potential hang-up condition. All units are on tap 5 in

TABLE 1

|  | Tr1 | Tap | Tr2 | Tap | Tr3 | Tap | Tr4 | Tap | Trn | Tap |
|---|---|---|---|---|---|---|---|---|---|---|
| 1) | ↑ | 5 | ↑ | 5 | ↑ | 5 | ↑ | 5 | ↑ | 5 |
| 2) | ↑ | 4 | ↓ | 4 | ↑ | 4 | ↑ | 4 | ↑ | 4 |
| 3) | ↓ | 4 | ↑ | 3 | ↑ | 4 | ↑ | 4 | ↑ | 4 |
| 4) | ↑ | 3 | ↑ | 3 | ↑ | 4 | ↑ | 4 | ↓ | 4 |
| 5) | ↑ | 3 | ↑ | 3 | ↑ | 4 | ↑ | 4 | ↑ | 3 |
| 6) | ↑ | 3 | ↑ | 3 | ↑ | 3 | ↑ | 3 | ↑ | 3 |
| 7) | ↑ | 3 | ↑ | 6 | ↑ | 6 | ↑ | 6 | ↓ | 6 |
| 8) | ↑ | 4 | ↑ | 7 | ↑ | 7 | ↓ | 7 | ↓ | 6 |
| 9) | ↑ | 5 | ↑ | 8 | ↓ | 8 | ↓ | 7 | ↓ | 6 |
| 10) | ↑ | 6 | ↓ | 9 | ↓ | 8 | ↓ | 7 | ↑ | 6 |
| 11) | ↑ | 7 | ↓ | 9 | ↓ | 8 | ↑ | 7 | ↑ | 7 |
| 12) | ↑ | 8 | ↓ | 9 | ↑ | 8 | ↑ | 8 | ↑ | 8 |
| 13) | ↑ | 9 | ↑ | 9 | ↑ | 9 | ↑ | 9 | ↑ | 9 |
| 14) | ↓ | 9 | ↓ | 7 | ↑ | 5 | ↑ | 6 | ↑ | 8 |
| 15) | ↓ | 8 | ↓ | 6 | ↑ | 5 | ↑ | 6 | ↓ | 8 |
| 16) | ↓ | 7 | ↓ | 5 | ↑ | 5 | ↑ | 6 | ↑ | 7 |
| 17) | ↓ | 6 | ↑ | 4 | ↑ | 5 | ↑ | 6 | ↓ | 7 |
| 18) | ↓ | 6 | ↑ | 5 | ↑ | 6 | ↓ | 7 | ↓ | 7 |
| 19) | ↓ | 5 | ↑ | 5 | ↓ | 6 | ↑ | 6 | ↓ | 6 |
| 20) | ↑ | 4 | ↑ | 5 | ↑ | 5 | ↓ | 6 | ↓ | 5 |
| 21) | ↑ | 5 | ↓ | 6 | ↑ | 6 | ↓ | 6 | ↑ | 5 |
| 22) | ↑ | 5 | ↑ | 5 | ↓ | 6 | ↑ | 5 | ↑ | 5 |
| 23) | ↑ | 5 | ↓ | 5 | ↓ | 5 | ↑ | 5 | ↓ | 5 | which case, in theory, the two currents to each control should be identical. We first assume that small errors are consistent and that each control chooses+as the relative phase angle of the currents, that the voltage is high and thus each control calls for a lowering of the tap position in T+T' time.

Assume that all controls time out in nearly the same time and moreover assume that the control logic is such that, once a tapchange is started it continues until the control receives a counter contact 108 (see FIG. 4) transition indicating that the tapchange is complete. Thus, each tapswitch lowers from tap 5 to tap 4 even though the total time required for each switch to do so is variable.

Once all are on tap 4, the relative current angles are likely to me measured as + for the same reasons as when all were on tap 5 in step 1. One reason for a deviation with tap position, however, is that the actual tap position may vary slightly in manufacture of the transformer, giving a slight voltage difference between units even though on the same tap. To illustrate this phenomena we assume that unit Tr3 has a slightly lower voltage than the other units which are essentially the same as each other.

Unit Tr3 load current then lags the other units. Since Tr3 measures its own load current as well as its companion Tr4, it assigns + to the relative phase angle, thereby permitting a tap raise. Unit Tr2 also measures unit Tr3 load current and assigns + to the relative current phase angle and permits a lowering of its tap position. Unit Tr4 compares its current to that from Trn; Trn compares its current to that from Tr1; and Tr1 compares its current to that from Tr2. These pairs of currents are theoretically in phase and again it is assumed that Tr4, Trn, and Tr1 assign a + thereby only permitting tap raises in time T.

This results in line 2 of Table 1.

2) Now assume that the voltage has returned to within the band, resetting all timers and then goes up again. Tr2 then times out in time T, lowering its tap to position 3.

This results in line 3 of Table 1.

3) Unit Tr2 load current then lags the other units. Since Tr2 measures its own load current as well as Tr3, it assigns + to the relative phase angle, thereby permitting a tap raise. Unit Tr1 also measures unit Tr3 load current and assigns − to the relative current phase angle and permits a lowering of Tr1 tap position. Unit Tr3 compares its current to that from Tr4, Tr4 compares its current to that from Trn, and Trn compares its current to that from Tr1. These three pairs of currents are theoretically in phase and again it is assumed that Tr3, Tr4, and Trn assigns + to the phase angle measurements thereby permitting only tap raises in time T.

Now assume that the voltage has returned to within the band, resetting all timers and then goes up again. Tr1 then times out in time T, lowering its tap to position 3.

This results in line 4 of Table 1.

4) Unit Tr1 and Tr2 load currents then lags the other units. Since Tr1 measures its own load current as well as Tr2, it assigns + to the relative phase angle, thereby permitting a tap raise. Unit Trn also measures unit Tr1 load current and assigns − to the relative current phase angle and permits a lowering of its tap position. Unit Tr3 compares its current to that from Tr4 and Tr4 compares its current to that from Trn. These two pairs of currents are theoretically in phase and again it is assumed that Tr3 and Tr4 assign + to the relative phase angle measurements thereby permitting tap raises.

Now assume that the voltage has returned to within the band, resetting all timers and then goes up again. Trn then times out in time T, lowering its tap to position 3.

This results in line 5 of Table 1.

5) Assume that the voltage remains high and that units Tr3 and Tr4 continue to time out to T+T' time upon which each will move to tap position 3.

This results in line 6 of Table 1.

6) And all units are on the same tap!

A second illustrative tapchange sequence uses lines 7) through 13) of Table 1.

7) Now assume that unit Tr3 is taken out of service and that all other units have moved to tap 6. Then assume that unit Tr3 is placed in service without having its tap position corrected to position 6 as it could have been manually. The voltage is within the band and all timers have reset.

Assume that the voltage goes down and that all timers time out to time T. Since Tr1 sees its own load current as well as Tr2, it assigns + thereby permitting an increase to tap 4. Tr2 sees its own load current as well as Tr3. Since both are on tap 6, by chance Tr2 assigns + thereby permitting an increase to tap 7. Tr3 sees its own load current as well as Tr4. Since both are on tap 6, by chance Tr3 assigns + thereby permitting an increase to tap 7. Tr4 sees its own load current as well as Trn. Since both are on tap 6, by chance Tr4 assigns+thereby permitting an increase to tap 7. Trn sees its own load current as well as Tr1. Due to the difference in tap positions, Trn assigns − thereby indicating a decrease to tap 5, however the change is blocked until T+T' time.

This results in line 8 of Table 1.

8) Assume that the voltage returns to within the band resetting timers T and T', then goes down again and that all timers time out to time T. Since Tr1 sees its own load current as well as Tr2, it assigns + thereby permitting an increase to tap 5. Tr2 sees its own load current as well as Tr3. Since both are on tap 7, by chance Tr2 assigns + thereby permitting an increase to tap 8. Tr3 sees its own load current as well as Tr4. Since both are on tap 7, by chance Tr3 assigns+thereby permitting an increase to tap 8. Tr4 sees its own load current as well as Trn. Due to the difference in tap positions, Tr4 assigns − and is blocked from making a tap change; staying on tap 7. Trn sees its own load current as well as Tr1. Due to the difference in tap positions, Trn assigns − and is blocked from making a tap change; staying on tap 6.

This results in line 9 of Table 1.

9) Assume that the voltage returns to within the band resetting time T, then goes down again and that all timers time out to time T. Since Tr1 sees its own load current as well as Tr2, it assigns + thereby permitting an increase to tap 6. Tr2 sees its own load current as well as Tr3. Since both are on tap 7, by chance Tr2 assigns + thereby permitting an increase to tap 9. Tr3 sees its own load current as well as Tr4. Due to the difference in tap positions, Tr3 assigns − and is blocked from making a tap change; staying on tap 8. Tr4 sees its own load current as well as Trn. Due to the difference in tap positions, Tr4 assigns − and is blocked from making a tap change; staying on tap 7. Trn sees its own load current as well as Tr1. Due to the difference in tap positions, Trn assigns − and is blocked from making a tap change; staying on tap 6.

This results in line 10 of Table 1.

10) Assume that the voltage returns to within the band resetting time T, then goes down again and that all timers time out to time T. Since Tr1 sees its own load current as well as Tr2, it assigns + thereby permitting an increase to tap 7. Tr2 sees its own load current as well as Tr3. Due to the difference in tap positions, Tr2 assigns − and is blocked from making a tap change; staying on tap 9. Tr3 sees its own load current as well as Tr4. Due to the difference in tap positions, Tr3 assigns − and is blocked from making a tap change; staying on tap 8. Tr4 sees its own load current as well as Trn. Due to the difference in tap positions, Tr4 assigns − and is blocked from making a tap change; staying on tap 7. Trn sees its own load current as well as Tr1. Due to the difference in tap positions, Trn assigns − and is blocked from making a tap change; staying on tap 6.

This results in line 11 of Table 1.

11) Now assume that the voltage has returned to within the band, resetting all timers and then goes down again. Tr1, Tr4 and Trn then time out in time T, and raise their taps to position 8. The other units remain blocked immediately after time T.

This results in line 12 of Table 1.

12) Now assume that the voltage has returned to within the band, resetting all timers and then goes down again. Tr1, Tr3, Tr4 and Trn then time out in time T, and raise their taps to position 9. Unit Tr2 is blocked from raising and therefore remains on tap 9 along with all other units.

13) Again, all units are on the same tap!

A third illustrative tapchange sequence uses lines 14) through 23) of Table 1.

14) Now assume that units have been placed on various taps as shown on line 14 for the purpose of demonstrating convergence of the inventive method of paralleling. From the above 13 steps it can be seen that simplified rules can be stated:

Rule A. When the unit to the right is on a higher tap, the arrow is ↑; when on a lower tap the arrow is ↓; when on the same tap the arrow is chosen by chance.

Rule B. If a unit has an up arrow and the voltage goes down, the unit will move to the next higher tap in the next line.

Rule C. If a unit has a down arrow and the voltage goes up, the unit will move to the next lower tap in the next line.

Rule D. If a unit is blocked by the direction of its arrow in a first line and if the voltage does not return to within the band in a second line then the unit can move in the direction opposite to its arrow in a third line.

15) Assume that the voltage goes above the band and follow the rules.

In steps 16 through 23, assume that the voltage returns to the band, resetting the timers and then goes above the band, and follow the rules.

23) Again the units are on the same tap

No formal closed proof in a strict mathematical sense is known that establishes that the inventive method will always bring paralleled units to the same tap or to some limiting number of tap differences; however all examples empirically analyzed appear to show that this is the case.

DIFFERENCES IN INPUT POWER SOURCE VOLTAGES

It is instructive to consider the consequences of unbalance with two paralleled units having source voltages which are not in phase. The heating effect of reactive current through a transformer is non-linear for two reasons. First the magnitude of the vector sum of the real and reactive components of current increases non-linearly as the square root of the sum of the squares of the two components. Secondly, the life of the units decreases non-linearly with overload conditions reaching a point where sudden and catastrophic failure results. When two units are overloaded, any unbalance in paralleling reduces the temperature of one unit and increases the temperature of the other thereby reducing the life of the hotter unit and causing costly power losses in the combination of units.

Figure 8:
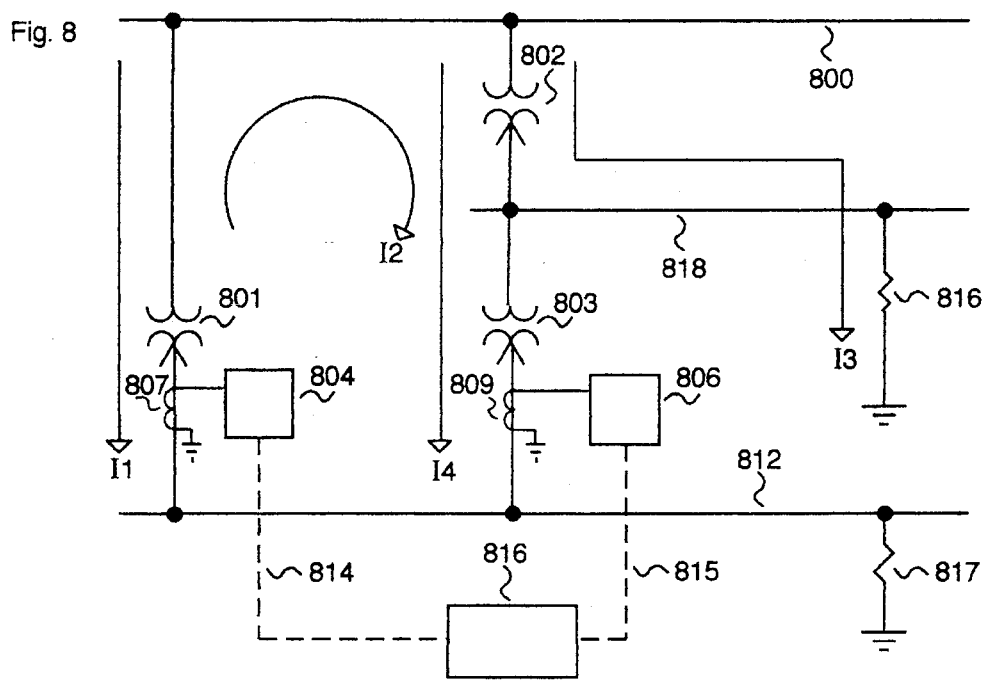
FIG. 8 is a diagram of paralleled units having a phase angle difference in unit supply voltages.

FIG. 8 shows one situation where the source voltage of two paralleled transformers may be out phase with each other. Transformer 801 and 803 operate in parallel to supply power to 69 kV bus 812. Transformer 802 supplies power to 115 Kv bus 818 and also supplies power to the primary of paralleled transformer 803. The effect of current I3 into load 816 on the 115 kv bus 818 together with current I4 feeding power to transformer 803 will cause a phase shift between primary and secondary voltage of transformer 802 as a result of the impedance of transformer 802. Thus the voltage of the 115 Kv bus 818 will not be in phase with the 230 Kv bus 800.

An unmodified paralleling scheme as described above or as in prior art minimizes circulating current I2 and makes current I4 equal to I1. Because of the difference in phase angle between transformer 801 source voltage 800 and transformer 803 source voltage 818, the power flowing through transformers 801 and 803 will be unequal. The heating of transformers 801 and 803 will therefore not be balanced even with proper operation of an unmodified paralleling scheme. It is desirable, therefore, when source voltages and currents are not in phase with each other, to balance the currents through each paralleled transformer so as to equalize the temperature rise of the two transformers.

Solution of the electric power network together with LTC transformers operated with outputs in parallel may be quite complex. A matrix of answers may be computed and stored as a table lookup for operation of transformers with outputs, but not inputs, in parallel. Such a table is formed with the real and imaginary components of the sum of paralleled transformer output currents as two dimensions of the lookup matrix. The answers are stored as correction angles are stored for the controllers for all paralleled transformers. Note that the correction angles are the differences in the load current phasor angles progressing around the ring of paralleled units and therefore the sum of the correction angles must be zero.

This inventive process is useful with all networks where such a table can be made. Note further that such a table may not be feasible for all possible paralleled networks.

The inventive process, therefore, is to communicate the phasor values of each unit's load current from each control to a central computer where a phasor sum is made and answers determined from a lookup table for transmission back to the controls.

Figure 1A:
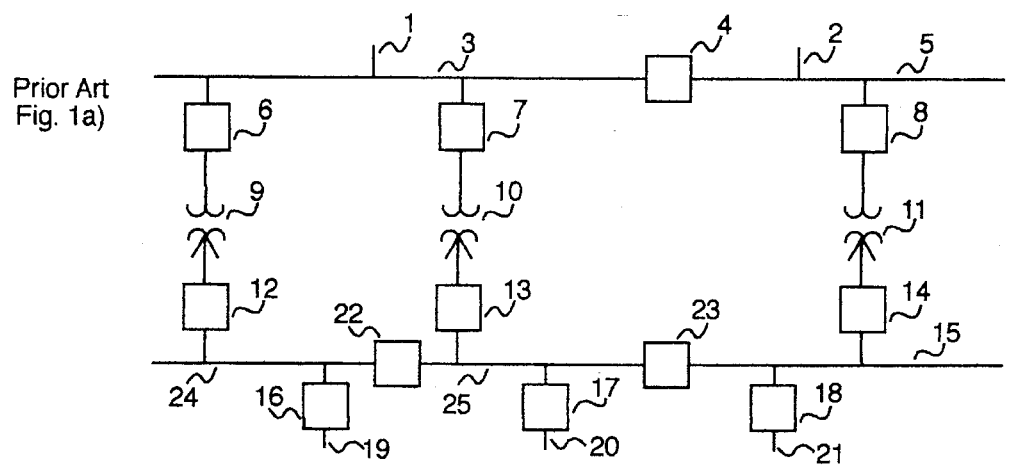
FIG. 1a is a one line diagram of a parallel connection of from two to "n" parallel LTC transformers for both prior art and for this invention.
Figure 1B:
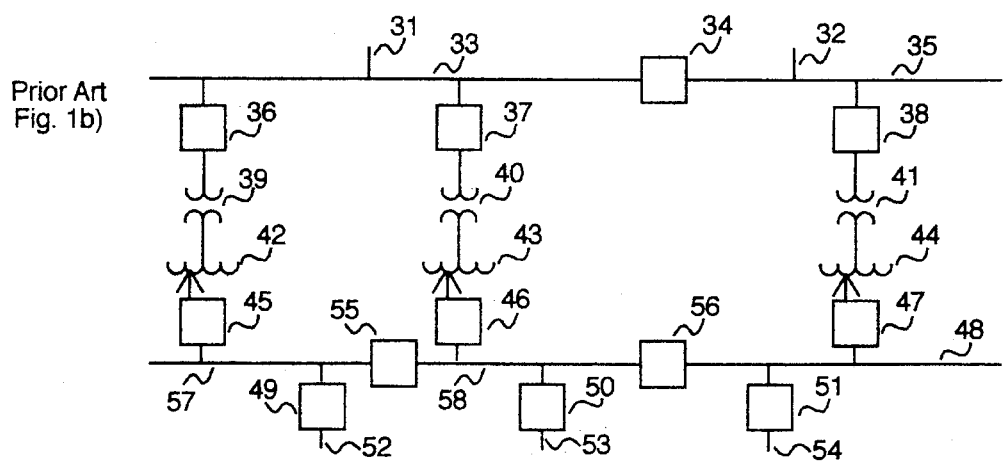
FIG. 1b is a one line diagram of a parallel connection of from two to "n" parallel transformer/regulator combinations for both prior art and for this invention.
Figure 9:
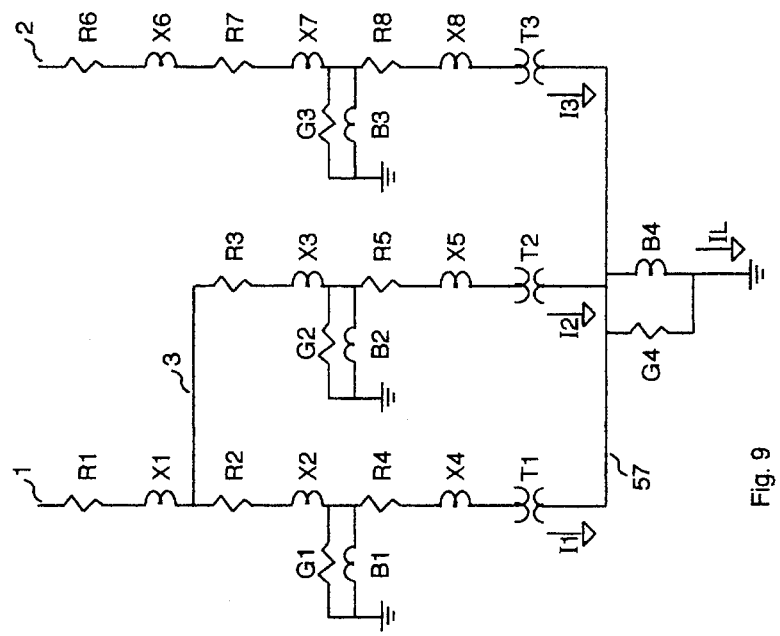

For example, refer to FIGS. 1*a* and 9 wherein FIG. 9 shows one representation of the network of FIG. 1*a* with breaker 4 open. Impedances R1 and X1 represent the power input line 1, and R6 and X6 represents the power input line 2. Impedances R2, X2, R4, X4, G1, and B1 together with an assumed perfect transformer T1 represent unit 9. Impedances R3, X3, R5, X5, G2, B2 together with an assumed perfect transformer T2 represents unit 10. Impedances R7, X7, R8, X8, G3, B3, together with an assumed perfect transformer T3 represents unit 11. Impedances G4 and B4 represent the load on paralleled bus 57 of FIG. 9, which consists of busses 24, 25 and 15 of FIG. 1 with breakers 22 and 23 closed.

Figure 11:
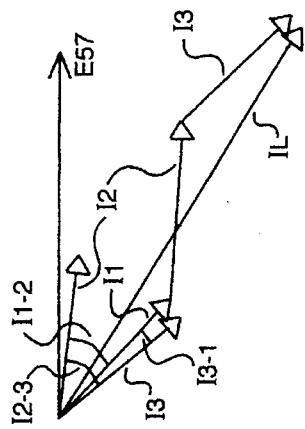
FIG. 11 is a phasor diagram showing the addition of three paralleled unit output currents to form a single load current.

FIG. 11 illustrates how phasors representing currents I1, I2, and I3 shown on FIG. 9 add to form the bus 57 load current IL (of FIG. 9). FIG. 11 shows currents I2 and I3 twice, once adding head to tail to phasor I1 to form IL, and also shown emanating from the origin where they are more easily related to phase reference phasor E57 representing the voltage on bus 57 of FIG. 9. FIG. 11 also shows phasor difference angles I1-2, I2-3 and I3-1. These are the angles whose signs are used to determine the sequence of tapchanges explained in relation to Table 1, above. Note that angle I1-2 is negative since I2 occurs earlier in time than I1. Angle I2-3 is positive since I3 occurs later in time than I2 and I3-1 is also negative since I1 occurs earlier than I3.

Figure 10:
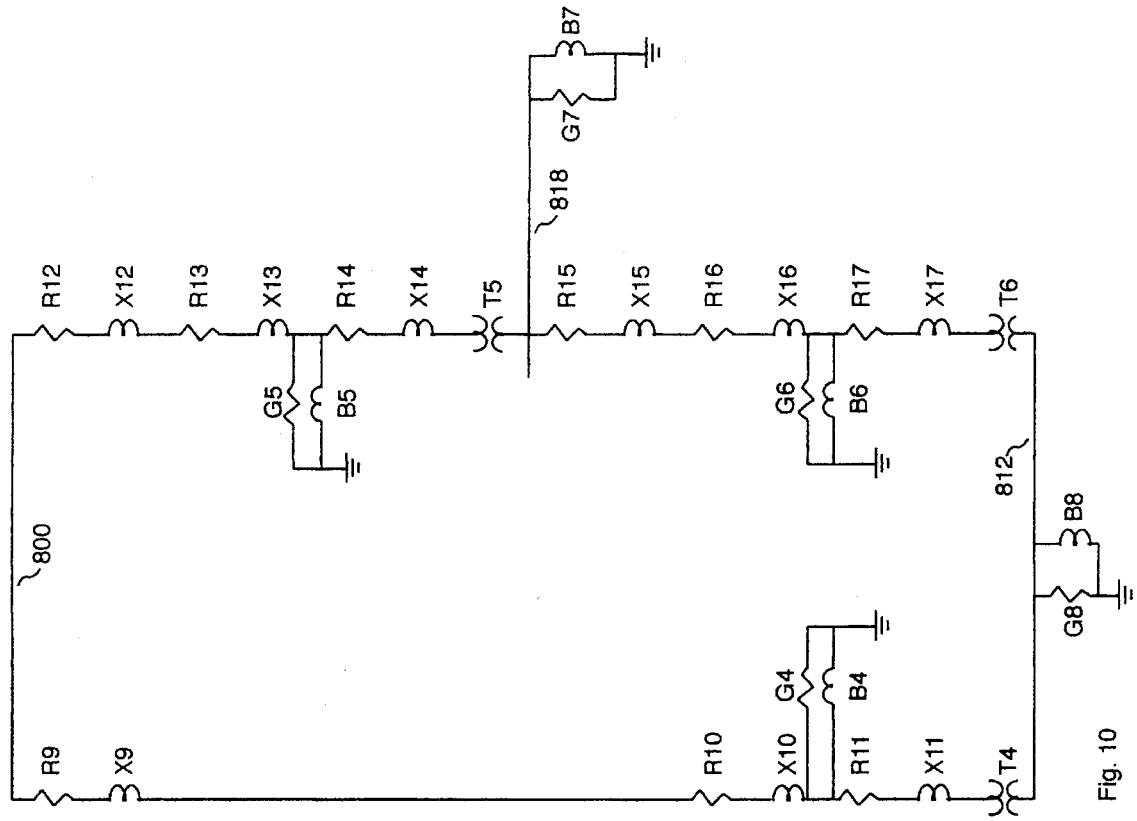
FIG. 10 is an impedance diagram corresponding to the circuit of FIG. 8.

FIG. 10 depicts one representation of the power network of FIG. 8 wherein again angular displacements are determined for units 801, 802 and 803 to produce a desired balance of losses between the three units. Impedances R9 and X9 represent the line from bus 800 to the primary of transformer 801. Impedances R10, X10, R11, X11, G4, B4, and assumed perfect transformer T4 represent transformer 801. Impedances R12 and X12 represent the line from bus 800 to the primary of transformer 802. Impedances R13, X13, R14, X14, G5, B5 and assumed perfect transformer T5 represent transformer 802. Impedances G7 and B7 represent the load on bus 818. Impedances R15 and X15 represent the line from bus 818 to the primary of transformer 803. Impedances R16, X16, R17, X17, G6, B6 and assumed perfect transformer T6 represent transformer 803. Impedances G8 and B8 represent the load on bus 812.

There are many network representations, similar to those demonstrated in FIGS. 9 and 10, corresponding to the many configurations of power networks and related LTC transformers. In general, these phasor representations of such networks are reduced to lookup tables of correction angles for entry into unit controls to enable the controls to change taps so as to maintain a desired balance of the units involved, such as a balance in temperature rise.

For example, tapchanger control 804, controlling transformer 801, provides data including the phasor components in load current I1 from current transformer 807 over communications channel 814 to computer 816. In a similar manner, tapchanger control 806, controlling transformer 803, provides data including the phasor components in load current I4 from current transformer 809 over communications channel 815 to computer 816. Using the current data supplied to computer 816 by controls 804 and 806, together with the afore mentioned look-up tables, computer 816 determines the appropriate phase angle corrections and sends them to controls 804 and 806.

FIG. 12 shows a circuit for a tapchanger control 162, see also FIG. 4. The circuit uses the means and methods of above referenced patent U.S. Pat. No. 5,315,527. The current from current transformer 107 enters primary 400 and by its secondary, not shown, induces a voltage signal, I1, proportional to the current across capacitor C1. The signal I1 is scaled by resistors R72 and R73, protected by diode D71, and connected to analog to digital (ADC) inputs A4 and A6 of microprocessor 421. Likewise, current from the adjacent unit control 162n, enters primary 401, of control 162a (see FIG. 4) and by its secondary, not shown, induces a voltage signal I2 across capacitor C2. The signal I2 is scaled by resistors R74 and R75, protected by diode D72, and connected to ADC inputs A5 and A7.

Figure 6:
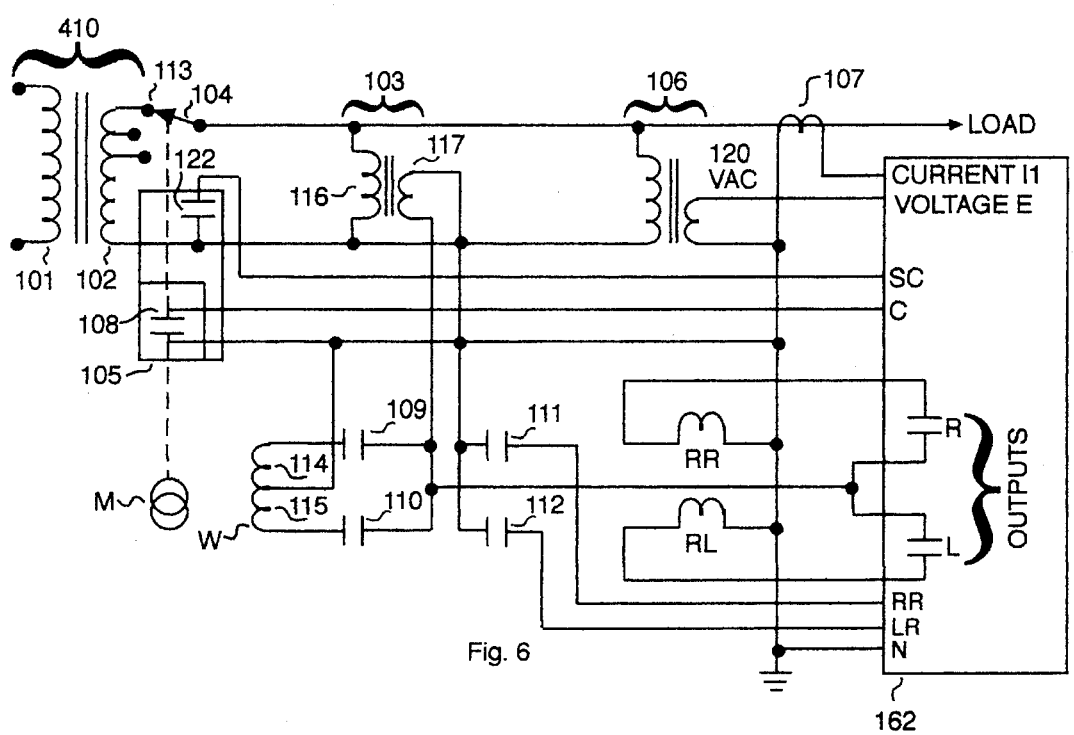
FIG. 6 depicts electrical connections for an LTC transformer, tapchanger control and associated components.

Microprocessor 421 of control 162, preferably a Motorola HC11E9, having ADC 422, ROM 423, RAM 424, EEPROM 426, asynchronous port 425, CPU 428, oscillator 429, ADC control registers 430 controlled by A/C control status register (ADCTL) 431. The frequency of oscillator 429 is controlled by crystal 435. Port 425 is connected to remote personal computer 381 by a communications path 383, see also FIG. 5. Raise and lower outputs R and L, see FIGS. 6 and 12, are provided by ports B & C 427. Power for the microprocessor is provided by supply 420, which also provides ADC voltage references VRH and VRL.

Using techniques described in the above mentioned patent application, Ser. No. 08/246,630, ADCTL 431 is set to control ADC 422 to sample ADC inputs A4, A5, A6, and A7 sequentially into registers 430 in the corresponding order R1, R2, R3 and R4 and to continue this sequence of sampling in daisy chain fashion. The CPU program then samples the registers in the same order, thereby obtaining alternate samples 441 of signal 440 and samples 442 of signal 443 (see FIG. 13). Table 2 illustrates a sampling sequence.

TABLE 2

| Signal 440 | 0 | | * | | * | | * | | * | | 0 |
| Signal 443 | | 0 | | * | | * | | * | | * | | 0 |
| Sample # | t0 | t1 | t2 | t3 | ........... | | t4 | t5 | t6 | t7 |
| Count of tiks | 0 | 0 | 3 | 4 | .................... | | | | 33 | 34 |

Where 0 means that the signal sample is zero and * means the signal sample was non-zero.

At the leading edge, signal 440 leads signal 443 by:

3−4=−1 tik

At the trailing edge, signal 440 leads signal 443 by:

33−34=−1 tik

The average is (−1+−1)/2=−1 tik, and the sign is negative.

The CPU program starts synchronously with the setting of ADCTL 431 so as to identify the first sample as coming, say, from signal 440. It first looks for all zero samples, as at samples t0 and t1. It then looks for the first +, as at sample t3 and records the count of tiks, 3, as the time mark for a znz transition of signal 440. It then looks for the first succession of two +'s as at sample t4 and records the count of tiks, 4, as the time mark for aa znz transition of signal 443. Counting the number of samples from the setting of ADCTL, it records the count, for example 33 in Table 2, when the first non-zero is obtained and then also records the count, for example 34, when successive samples are both non-zero. It thus records time in tiks of the non-zero to zero transition (nzz) of signal 440 and also the (nzz) transition of signal 443. As used in reference patent application Ser. No. 08/246,630, a tik is defined as the time in CPU clock cycles for the ADC to take a sample.

Figure 13:
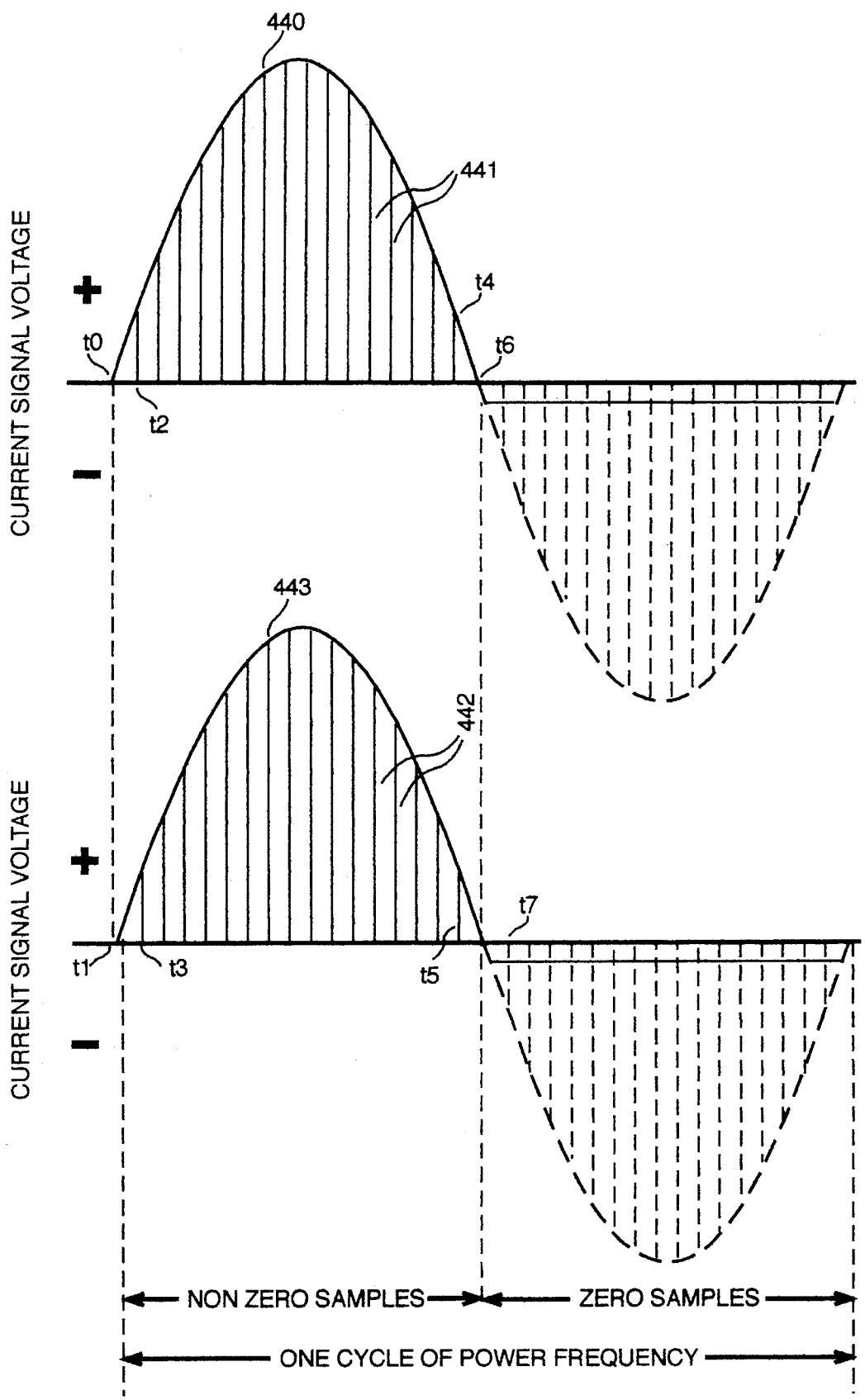
FIG. 13 shows the digital sampling of two current waves using the circuit of FIG. 12.

The phase angle difference between I1, represented by signal 440 of FIG. 13, and I2, represented by 443 of FIG. 13, is proportional to the average between a first difference in records of counts of tiks between the znz transitions of signals I1 and I2 and a second difference in records of tiks at the nzz transitions of I1 and I2. As shown in FIG. 13, I1 leads I2 and the arrow will be ↓ for use in Table 1, above. Note that signal I1, in FIG. 12 is shown coming through transformer 400 which relates to FIG. 4. It therefore represents the load current from some control 162's own unit 410. In like manner, current I2, coming through transformer 401 represents load current from an adjacent unit 401.

The circuits and methods described by FIGS. 11 and 12 allow resolution of the phase angle difference between two signals to within one tik. Using the preferred Motorola HC11 microprocessor, the ADC updates in 32 clock cycles. With a 3 megabit clock, a tik is then 10.07 microseconds or 0.218° of angular resolution; well within the requirements developed above.

ADVANTAGES OF THE INVENTION

1) Fewer components required.
2) No trial and error adjustments required.
3) Better tracking of tap position than generally obtainable with the prior art circulating current method.
4) Is usable with transformers having outputs connected in parallel and with inputs supplied from non-paralleled sources.

While the invention has been particularly shown and described with reference to a preferred embodiment thereof, it will be understood by those skilled in the art that various changes in form and in details may be made therein without departing from the spirit and scope of the invention.

I claim:

1. A method for utilizing alternating current (AC) voltage controlling load tapchanging transformers and regulator/transformer combinations (tapchanging units) each having AC load currents connected to a common paralleling output point, wherein said tapchanging units have tapswitches with multiple tap positions and controls to selectively cause said tapswitches to move to selected tap positions, said method comprising of the steps of:
   a) forming a ring connection of said controls,
   b) determining the AC load current flowing from each said tapchanging unit to said common paralleling output point,
   c) combining pairs of AC load currents provided by a first unit and a second unit, said second unit being adjacent to said first unit in a selected direction around said ring,
   d) each said control determining the relative time of occurrence of the cycles of said combined pair of AC load currents, and
   e) utilizing said determinations to cause said tapswitch to move to seek desired relations between times of occurrence of all said AC load currents.

2. A method for utilizing alternating current (AC) voltage controlling load tapchanging transformers and regulator/transformer combinations (tapchanging units) each having first and second AC load currents of distinct phases dependent on the associated tapchanging unit, and said currents being connected to a common paralleling output point, wherein said tapchanging units have tapswitches with multiple tap positions and tap changing controls, said controls selectively measuring the duration of time of AC voltages above and below upper and lower AC voltage bandedges to selectively cause said tapswitches to move to selected tap positions, said method comprising the steps of:
   a) sensing the AC load current on a first Of said tapchanging units being controlled and sensing the AC load current on a second tapchanging unit, said second unit being adjacent to said first tapchanging unit,
   b) permitting tapchanges which lower the tapswitch position of said first tapchanging unit and blocking those tapchanges which would raise said tapswitch position when said first AC load current phase leads said second AC load current phase,
   c) permitting tapchanges which raise the tapswitch position of said first said tapchanging unit and blocking those tapchanges which would lower said tapswitch position when said first AC load current phase lags said second AC load current phase,
   d) initiating said permitted tapchanges after duration of a first time T, and
   e) initiating said blocked tapchanges after duration of a second longer time T+T'.

3. A method as in claim 1 further including the step of seeking the same time of occurrence of said AC load currents.

4. A method as in claim 1 further including the step of seeking the same tap positions on all units.

5. A method as in claim 1 further including the step of providing a phase angle bias for each of said control whereby said controls cause tap switches to move to seek desired relations between times of occurrence of all said load currents.

6. A method as in claim 1 further including the steps of:
   a) disconnecting a selected unit and its control from said ring,
   b) reconnecting the remaining unit's controls in a ring whereby the remaining units continue to operate in the same manner as in claim 1.

7. A method as in claim 1 further including the steps of:
   a) providing each said control with positive half cycles of a first AC signal representative of said load current of said first unit,
   b) providing each unit control with positive half cycles of a second AC signal representative of said load current of said second unit,
   c) sensing which full positive half cycle of said first and second current signals comes first in time, and
   d) selectively raising and lowering tapswitches in response to said first in time determination by each said control.

8. Apparatus including alternating current (AC) voltage controlling tapchanging units having AC load currents each with a distinct phase connected to a common paralleling output point, control means for said tapchanging units having tapswitches with multiple tap positions providing selected output voltages, said controls causing said tapswitches to move to selected tap positions, said apparatus comprising in combination:
   a) said control means controlling a first tapchanging unit and including means for sensing the AC load current of said unit,
   b) said sensing means connected to provide pairs of AC load currents in a daisy chain configuration,
   c) said sensing means sensing the AC load current in each unit and the AC Load current in an adjacent unit in one direction around said daisy chain configuration,
   d) said sensing means determining which current of each said pair leads in phase, and
   e) said daisy chain configuration enabling said control means to react to said determinations to cause said tapswitches to move to selected tap positions to establish desired relations between the phases of all said AC load currents.

9. A method as in claim 2 further including the steps of:
a) raising said tapswitch one tap position in response to said voltage being below said voltage bandedge after said time T when said first load current lags said second load current,
b) lowering the tapswitch one tap position in response to said voltage being above said voltage bandedge after said time T when said first load current leads said second load current,
c) lowering said tapswitch one tap position in response to said voltage being below said voltage bandedge after said time T+T' when said first load current lags said second load current, and
d) raising said tapswitch one tap position in response to said voltage being above said voltage bandedge after said time T+T' when said first load current leads said second load current whereby the combined control action precludes potential blocking conditions.

* * * * *